US012715807B2

(12) United States Patent
Kim et al.

(10) Patent No.: US 12,715,807 B2
(45) Date of Patent: Aug. 25, 2026

(54) ANTIBACTERIAL GLASS COMPOSITE AND MANUFACTURING METHOD THEREOF

(71) Applicant: LG ELECTRONICS INC., Seoul (KR)

(72) Inventors: Namjin Kim, Seoul (KR); Daesung Kim, Seoul (KR); Young Seok Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 996 days.

(21) Appl. No.: 17/793,231

(22) PCT Filed: Jan. 15, 2021

(86) PCT No.: PCT/KR2021/000602

§ 371 (c)(1),
(2) Date: Jul. 15, 2022

(87) PCT Pub. No.: WO2021/145724

PCT Pub. Date: Jul. 22, 2021

(65) Prior Publication Data

US 2023/0104004 A1 Apr. 6, 2023

(30) Foreign Application Priority Data

Jan. 17, 2020 (KR) ........................ 10-2020-0006890

(51) Int. Cl.
*C03C 3/066* (2006.01)
*C03C 4/00* (2006.01)

(52) U.S. Cl.
CPC ................ *C03C 3/066* (2013.01); *C03C 4/00* (2013.01); *C03C 2203/10* (2013.01); *C03C 2204/02* (2013.01)

(58) Field of Classification Search
CPC ........... C03C 3/066; C03C 3/089; C03C 4/00; C03C 2204/02
See application file for complete search history.

(56) References Cited

U.S. PATENT DOCUMENTS 6,410,633 B1 6/2002 Hikata et al.
8,080,490 B2 12/2011 Fechner et al.
2005/0069592 A1 3/2005 Fechner et al.
2006/0142413 A1* 6/2006 Zimmer .................. C03C 3/089 523/122
2006/0166806 A1 7/2006 Fechner et al.
2006/0172877 A1 8/2006 Fechner et al.
2007/0122356 A1 5/2007 Kessler et al.
2008/0153068 A1 6/2008 Kessler et al.
2013/0130004 A1* 5/2013 Milia .................... C03C 17/002 977/755
2017/0340666 A1 11/2017 Deng et al.
2018/0029927 A1* 2/2018 Ishihara ................ C03C 17/008
2021/0047232 A1 2/2021 Gwoo et al.
2021/0246067 A1 8/2021 Choi et al.

FOREIGN PATENT DOCUMENTS

DE 10141230 3/2003
JP H06-219771 8/1994
JP H08 245237 9/1996
JP H10218637 8/1998
JP 2005-500972 1/2005
JP 2005-524594 8/2005
JP 2006-052918 2/2006
JP 2006-520311 9/2006
JP 3845975 11/2006
JP 7014825 2/2022
KR 10-2007-0015393 2/2007
KR 10-2019-0012205 2/2019
KR 10-2019-0123570 11/2019
KR 10-2019-0123571 11/2019
WO WO 2019/208975 10/2019

OTHER PUBLICATIONS

Korean Notice of Allowance dated Feb. 22, 2023 issued in Application No. 10-2020-0006890.
Chinese Office Action dated Mar. 18, 2023 issued in Application No. 202180009528.3.
Extended European Search Report dated Feb. 26, 2024 issued in Application No. 21741910.0.
International Search Report (with English Translation) dated Apr. 27, 2021 issued in PCT Application No. PCT/KR2021/000602.

* cited by examiner

*Primary Examiner* — Laura A Auer
(74) *Attorney, Agent, or Firm* — KED & ASSOCIATES, LLP

(57) ABSTRACT

There is disclosed an antibacterial glass composite and a manufacturing method thereof. The antibacterial glass composite may include 15 to 40% by weight (wt) of $SiO_2$: 20 to 40% wt of $B_2O_3$: 10 to 30% wt of at least one of $Na_2O$, $K_2O$ and $Li_2O$; to 15% wt of at least one of MgO and $TiO_2$; 5 to 40% wt of at least one of ZnO and CaO; to 10% wt of CuO; and 0.1 to 3% wt of Ag2O, thereby having an anti-biofilm effect.

15 Claims, No Drawings

ANTIBACTERIAL GLASS COMPOSITE AND MANUFACTURING METHOD THEREOF

CROSS-REFERENCE TO RELATED PATENT APPLICATIONS

This application is a U.S. National Stage Application under 35 U.S.C. § 371 of PCT Application No. PCT/KR2021/000602, filed Jan. 15, 2021, which claims priority to Korean Patent Application No. 10-2020-0006890, filed Jan. 17, 2020, whose entire disclosures are hereby incorporated by reference.

BACKGROUND

Technical Field

The present disclosure relates to an antibacterial glass composite having antibacterial properties and a manufacturing thereof.

Background Art

Microorganisms such as germs, fungi and bacteria are ubiquitous in our living spaces (e.g., washbasins, refrigerator shelves and washing machines). If these microbes get into our bodies, they cause life-threatening infections. Accordingly, there is a need for an antibacterial glass composite that is capable of controlling the spread of microorganisms in household items such as washbasins, refrigerator shelves, ovens or washing machines.

Antimicrobial glass powder is well known. Conventional antimicrobial glass powder may release metal ions by controlling the contents of $P_2O_5$ and $Al_2O_3$, thereby expressing antibacterial properties. However, if such antibacterial agents are included in foods or cosmetics that directly affect the human body, metal ions may be absorbed into the body and harmful.

In addition, the antibacterial glass powder may be applied to plastic injection molding and the injection molding product may be used for home appliance and the like.

The surface of the injection molded product to which the antibacterial glass powder to which the antibacterial glass powder is applied may have antibacterial activity. When antibacterial activity is expressed only on the surface of the injection molded product, the initial bacterial present on the surface are killed by the antibacterial activity. However, the initial dead bacterial accumulate on the surface of the injection molded product and the dead bacterial could create an environment in which the later bacterial live well. In this way, dead bacterial accumulate to form a film, which is called a bio film. Expression of antibacterial activity only on the surface of plastic injection moldings cannot help reduce the bio fill. When the plastic injection product comes into contact with water, it is necessary to create an environment where bacterial cannot live even in the surrounding water. However, conventional antibacterial glass may not have the above-mentioned effects.

CITED PATENT REFERENCE

Cited Document 1

Japanese Patent No. 3845975

DESCRIPTION OF DISCLOSURE

Technical Problems

Accordingly, an object of the present disclosure is to address the above-noted and other problems and to provide a novel antibacterial glass composite using the elution of components that are harmless to the human body.

Another object of the present disclosure is to provide a novel antibacterial glass composite having excellent anti-bio film effect.

Technical Solutions

To solve the above technical problems, an antibacterial glass composite according to the present disclosure may be characterized to properly control the content of Cu and Ag and the composition ratio of the other components.

The antibacterial glass composite may include 15 to 40% by weight (wt) of $SiO_2$: 20 to 40% wt of $B_2O_3$: 10 to 30% wt of at least one of $Na_2O$, $K_2O$ and $Li_2O$; 0.1 to 15% wt of at least one of MgO and $TiO_2$; 5 to 40% wt of at least one of ZnO and CaO; 0.1 to 10% wt of CuO; and 0.1 to 3% wt of $Ag_2O$, thereby having an anti-biofilm effect.

The content of $B_2O_3$ may be greater than or equal to the content of $SiO_2$. The $Li_2O$ may be contained in 3% wt or less.

Advantageous Effect

The present disclosure may have following advantageous effects. The antibacterial glass composite according to the present disclosure has an excellent anti-bio film effect by controlling the composition ratio.

In addition, the antibacterial glass composite according to the present invention may be used as a multi-purpose antibacterial agent that may be applied to various product groups.

DETAILED DESCRIPTION OF EXEMPLARY EMBODIMENT

The above-described aspects, features and advantages are specifically described hereunder with reference to the accompanying drawings such that one having ordinary skill in the art to which the present disclosure pertains can easily implement the technical spirit of the disclosure. In the disclosure, detailed descriptions of known technologies in relation to the disclosure are omitted if they are deemed to make the gist of the disclosure unnecessarily vague. Below, preferred embodiments according to the disclosure are specifically described with reference to the accompanying drawings. In the drawings, identical reference numerals can denote identical or similar components.

Hereinafter, expressions of 'a component is provided or disposed in an upper or lower portion' may mean that the component is provided or disposed in contact with an upper surface or a lower surface. The present disclosure is not intended to limit that other elements are provided between the components and on the component or beneath the component.

It will be understood that when an element is referred to as being "connected with" or "coupled to" another element, the element can be directly connected with the other element or intervening elements may also be present. In contrast, when an element is referred to as being "directly connected with" another element, there are no intervening elements present.

Throughout the specification, unless otherwise stated, each element may be singular or plural.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Throughout the disclosure, the terms "A and/or B" as used herein can denote A, B or A and B, and the terms "C to D" can denote C or greater and D or less, unless stated to the contrary.

Hereinafter, an antibacterial glass composite according to the present disclosure and a manufacturing method thereof will be described in detail.

<Antibacterial Glass Composite>

The antibacterial glass composite according to the present disclosure may include 5 to 40% by weight (i.e., wt) of $SiO_2$; $B_2O_3$ 20-40 wt %; 10-30 wt % of at least one of $Na_2O$, K2O and Li2O; 0.1-15 wt % of at least one of MgO and $TiO_2$; 5-40 wt % of at least one of ZnO and CaO; 0.1-10 wt % CuO; and 0.1 to 3% by weight of $Ag_2O$.

The antibacterial glass composite according to the present disclosure may have particularly excellent anti-bio film effect. Hereinafter, components of the antibacterial glass composite according to the present disclosure will be described in detail.

$SiO_2$ is a key component configured to form a glass structure and serve as a frame of the glass structure. The antibacterial glass composite according to the present disclosure may contain $SiO_2$ in an amount of 15 to 40 wt %. When $SiO_2$ is contained in an amount exceeding 40 wt %, there may be a problem in that the workability is reduced in a quenching process as the viscosity increases when glass is melted. Conversely, when $SiO_2$ content is less than 15 wt %, there may be another problem in that the structure of glass could be weakened and water resistance could be lowered.

$B_2O_3$ together the $SiO_2$ may be a component configured to serve as a glass former to facilitate vitrification of a glass composition. $B_2O_3$ may a component configured to not only lower the eutectic point of the melt because of its low melting point, but also help the glass component to be easily vitrified. The antibacterial glass composite according to the present disclosure may contain 20-40 wt % of $B_2O_3$. When the $B_2O_3$ content exceeds 40% wt, there may be a problem in that the antibacterial properties are rather deteriorated as the content of the other components is disturbed. Conversely, when the $B_2O_3$ content is less than 20% wt, the structure of the glass could be weakened and there may be a problem in that water resistance is lowered.

It may be preferred that the $B_2O_3$ content of the antibacterial glass composite according to the present disclosure is greater than or equal to the $SiO_2$.

Alkali oxides (e.g., $Na_2O$, $K_2O$ and $LI_2O$) may be non-crosslinked oxides acting as a network modifier in the glass composite. Although vitrification is impossible separately among the above components, vitrification may be possible when they are mixed with a network former (e.g., $SiO_2$ and $B_2O_3$) in a predetermined ratio. If only one of the above components is contained in the glass composite, the durability of glass might be weakened within the vitrifiable region. However, when two or more components are contained in the glass composite, the durability of the glass may be improved again based on the ratio. The antibacterial glass composite according to the present disclosure may contain 10 to 30% wt (i.e., by weight) of at least one $Na_2O$, $K_2O$, and $Li_2O$. When at least one of $Na_2O$, $K_2O$ and $Li_2O$ is included in the composition in an amount exceeding 30% wt, the durability of the glass composite might rapidly deteriorate. Conversely, when at least one of $Na_2O$, K2O and $Li_2O$ is contained in less than 10 wt %, vitrification might be difficult.

It is preferred that the antibacterial glass composite according to the present disclosure may include 3% wt or less of $Li_2O$. When $Li_2O$ is included more than 3% wt, vitrification could be difficult and possibility of devitrification could increase.

MgO and $TiO_2$ may be components configured to improve chemical durability and heat resistance of glass. The antibacterial glass composite according to the present disclosure may include 0.1 to 15% by weight of at least one of MgO and $TiO_2$. When at least one of MgO and $TiO_2$ is included in an amount of less than 0.1 wt %, durability of the glass might be deteriorated. Conversely, when at least one of MgO and $TiO_2$ is included in an amount exceeding 15% wt, devitrification might occur in the glass melting process.

ZnO and CaO may be components configured to act as both a network former and a network modifier in terms of the glass structure. In addition, they may be one of the components configured to express the antibacterial properties of the glass composite. The antibacterial glass composite according to the present disclosure may contain to 40% wt of at least one of ZnO and CaO. When at least one of ZnO and CaO is contained in an amount of less than 5% wt, it could be difficult to express the antibacterial properties of the glass composite. Conversely, if at least one of ZnO and CaO is contained in an amount of exceeding 40% wt, the durability or thermal properties of the glass composite might be deteriorated.

CuO and $Ag_2O$ may be key components configured to express the antibacterial properties of the glass composite according to the present disclosure. The above two components may have high antibacterial activity against Pseudomonas aeruginosa that is the main causative agent of bio film. The antibacterial glass composite according to the present invention contains 0.1 to 10% wt of CuO and 0.1 to 3% wt of $Ag_2O$. When the CuO content exceeds 10% wt, Cu could be precipitated on the surface of glass and form a heterogeneous glass. When the AgO content exceeds 5% wt, Cu might be precipitated on the surface of the glass and form heterogeneous glass. Conversely, when the components are contained in less than the minimum component, the antibacterial activity might be reduced.

<Manufacturing Method of Antibacterial Glass Composite>

Next, a manufacturing method of an antibacterial glass composite will be described in detail.

The manufacturing method of the antibacterial glass composite according to the present disclosure may include a process of providing the above-described components of the antibacterial glass composite; a process of melting the components of the antibacterial glass composite; and a process of forming the antibacterial glass composite by cooling the melted components of the antibacterial glass composite in a quenching roller.

After sufficiently mixing the components of the antibacterial glass composite, the components may be melted. Preferably, the antibacterial glass composite components may be melting in a temperature range of 1200 to 1300° C.

in an electric furnace. The antibacterial glass composite components may be melting for 10 to 60 minutes.

Hence, the melted components of the antibacterial glass composite may be quenched by a quencher using a chiller or the like, thereby forming the antibacterial glass composite.

<Method of Applying Antibacterial Glass Composite>

Next, the antibacterial glass composite according to the present disclosure may be coated on one surface of a target object to which the antibacterial glass composite is applied. The target object may be a metal plate, a tempered glass plate, a part or all of a cooling appliance. As the coating method, a method of applying a coating solution to the surface of the target object and firing may be used or a spray method may be used. The coating method is not limited thereto. The antibacterial glass composite may be fired at a temperature range of 700 to 750° C. for 300 to 450 seconds.

In addition, the antibacterial glass according to the present disclosure may be applied as an additive to a plastic resin injection molding. The surface of the plastic resin injection molding may be provided with antibacterial activity by including an appropriate amount of antibacterial glass powder in the plastic resin injection molding.

Hereinafter, specific examples will be described through embodiments.

Embodiment

<Manufacturing of Antibacterial Glass Composite>

The antibacterial glass composite having the composition ratios shown in Table 1 may be prepared. Raw materials of each component are thoroughly mixed for 3 hours in a V-mixer. Here, $Na_2CO_3$, $K_2CO_3$, $Li_2CO_3$ and $CaCO_3$ are used as raw materials of $Na_2O$, $K_2O$, $Li_2O$, and CaO, respectively, and the remaining components are the same as those in Table 1 are used. The other components are the same materials as in Table 1. The mixed materials are sufficiently mixed at 1300° C. for 30 minutes and quenched on a quenching roller to obtain a glass cullet.

The glass cullet obtained in the above process is pulverized for about 5 hours by using a jet mill after controlling the initial particle size with a ball mill. Hence, the pulverized powder may pass through a 325 mesh sieve (ASTM C285-88) to control the D50 particle size to 5 to 15 μm, and finally an antibacterial glass powder is prepared.

TABLE 1

| Ingredient | Embodiment 1 | Embodiment 2 | Embodiment 3 | Comparative embodiment 1 | Comparative embodiment 2 | Comparative embodiment 3 |
|---|---|---|---|---|---|---|
| $SiO_2$ | 25.2 | 19.1 | 26 | 41 | 30.5 | 32.3 |
| $B_2O_3$ | 27.9 | 24.7 | 25 | 20 | 23.5 | 22.8 |
| $Na_2O$ | 9.5 | 10.4 | 11 | 10.5 | 12.9 | 4.7 |
| $K_2O$ | 6.3 | 5.7 | 6 | 6 | 7.1 | 4.8 |
| $Li_2O$ | 1.2 | 0.9 | 1 | 2 | 2.4 | 0 |
| MgO | 0.5 | 0.5 | 0.3 | 0 | 0.8 | 0.6 |
| $TiO_2$ | 0.5 | 0.7 | 0.5 | 0.5 | 0.5 | 1.6 |
| ZnO | 20.4 | 28.4 | 20 | 20 | 22.3 | 29.2 |
| CaO | 6 | 0 | 5 | 0 | 0 | 0 |
| $Ag_2O$ | 0.5 | 0.1 | 0.2 | 0 | 0 | 0 |
| CuO | 2 | 9.5 | 5 | 0 | 0 | 4 |

<Manufacturing Antibacterial Glass Added Plastic Injection Molding>

An injection molding having a level of 200 mm×100 mm and a thickness of 3 mm is prepared using polypropylene resin. Three injection-moldings each containing 4% wt of the antibacterial glass powder of Embodiments 1 to 3 and three injection-molded products each containing 4% by weight of the antibacterial glass powder of Comparative Embodiments 1 to 3 are prepared. An experiment on the anti-bio film is carried out on the above six extrudates.

Experimental Example—Antibacterial Degree, Anti-Bio Film

Antibacterial properties are evaluated as follows for the injection moldings prepared in Embodiments and Comparative examples.

ASTM E2149-13a shaking flask method is used to confirm the antibacterial activity of the antibacterial glass composite according to the present disclosure.

The standard test method ASTM E2562-12 is used to confirm the anti-bio film effect.

TABLE 2

| | Embodiment 1 | Embodiment 2 | Embodiment 3 | Comparative embodiment 1 | Comparative embodiment 2 | Comparative embodiment 2 |
|---|---|---|---|---|---|---|
| Antibacterial activity (ASTM E2149-13a Shake flask method) *Stanphylococcus aureus* | 99.9% | 99.9% | 99.9% | 67.0% | 40.0% | 98.1% |
| Antibacterial activity ASTM E22149-13a Shake flask method) *Escherichia coli* | 99.9% | 99.9% | 99.9% | 47.5% | 42.9% | 71.2% |
| Antibacterial activity ASTM E2149-13a Shake flask method *Klebsiella pneumoniae* | 99.9% | 99.9% | 99.9% | 68.8% | 73.8% | 99.9% |
| Anti-bio film ASTM e2562-12 *Pseudomonas aeruginasa* | 99.9% | 99.9% | 99.9% | 79.0% | 91.2% | 99.9% |
| pH Evaluation after immersion in room temperature water for 32 h, initial value | 8.8 | 9.1 | 8.4 | 7.6 | 8.1 | 7.6 |

As shown in Table 2, it may be confirmed that the embodiments of the present disclosure have very excellent antibacterial performance.

The comparative embodiments may be confirmed to be very unsatisfactory in the antibacterial performance compared to the embodiments.

The embodiments are described above with reference to a number of illustrative embodiments thereof. However, the present disclosure is not intended to limit the embodiments and drawings set forth herein, and numerous other modifications and embodiments can be devised by one skilled in the art. Further, the effects and predictable effects based on the configurations in the disclosure are to be included within the range of the disclosure though not explicitly described in the description of the embodiments.

What is claimed is:

1. An antibacterial glass composite comprising:

15 to 26% by weight (wt) of $SiO_2$:

20 to 40% wt of $B_2O_3$:

10 to 30% wt of at least one of $Na_2O$, $K_2O$, or $Li_2O$;

0.1 to 15% wt of at least one of MgO or TiO2;

25 to 40% wt of at least one of ZnO or CaO;

0.1 to 10% wt of CuO; and 0.1 to 3% wt of $Ag_2O$.

2. The antibacterial glass composite of claim 1, wherein a content of $B_2O_3$ is greater than or equal to a content of $SiO_2$.

3. The antibacterial glass composite of claim 1, wherein a content of $Li_2O$ in the antibacterial glass composite is 3% wt or less.

4. A manufacturing method of an antibacterial glass composite of the claim 1, the method comprising:

providing the components of the antibacterial glass composite of claim 1 melting the components of the antibacterial glass composite; and cooling the melted components of the antibacterial glass composite.

5. The manufacturing method of the antibacterial glass composite of claim 4, wherein a content of $B_2O_3$ is greater than or equal to a content of $SiO_2$.

6. The manufacturing method of the antibacterial glass composite of claim 4, wherein a content of $Li_2O$ in the antibacterial glass composite is 3% wt or less.

7. The manufacturing method of the antibacterial glass composite of claim 4, wherein melting the components of the antibacterial glass composite includes melting the components of the antibacterial glass composite in a temperature range of 1200 to 1300° C.

8. The manufacturing method of the antibacterial glass composite of claim 7, wherein melting the components of the antibacterial glass composite includes melting the components of the antibacterial glass composite for 10 to 60 minutes.

9. The manufacturing method of the antibacterial glass composite of claim 4, wherein the melted components of the antibacterial glass composite are cooled by a quenching roller.

10. The manufacturing method of the antibacterial glass composite of claim 4, wherein a glass cullet is formed when the melted components of the antibacterial glass composite are cooled, and wherein manufacturing method further comprises:

milling the glass cullet using a ball mill;

pulverizing the milled glass cullet using a jet mill to generate a pulverized powder; and passing the pulverized powder through a 325-mesh sieve to form the antibacterial glass composite with a D50 particle size of 5 to 15 μm.

11. The antibacterial glass composite of claim 1, wherein the antibacterial glass composite is coated on a surface of a metal plate, a tempered glass plate, or a part included in a cooling appliance.

12. The antibacterial glass composite of claim 11, wherein the antibacterial glass composite is coated on the surface by applying a coating solution including the antibacterial glass composite to the surface and firing the surface.

13. The antibacterial glass composite of claim 12, wherein firing the surface including heating the antibacterial glass composite at a temperature range of 700 to 750° C. for 300 to 450 seconds.

14. The antibacterial glass composite of claim 1, wherein the antibacterial glass composite is applied as an additive to a plastic resin injection molding.

15. The antibacterial glass composite of claim 14, wherein the plastic resin injection molding includes 4% wt of the antibacterial glass composite.

* * * * *